May 31, 1960 D. D. DEMAREST 2,938,398
TRANSMISSION
Filed Oct. 16, 1958 2 Sheets-Sheet 1
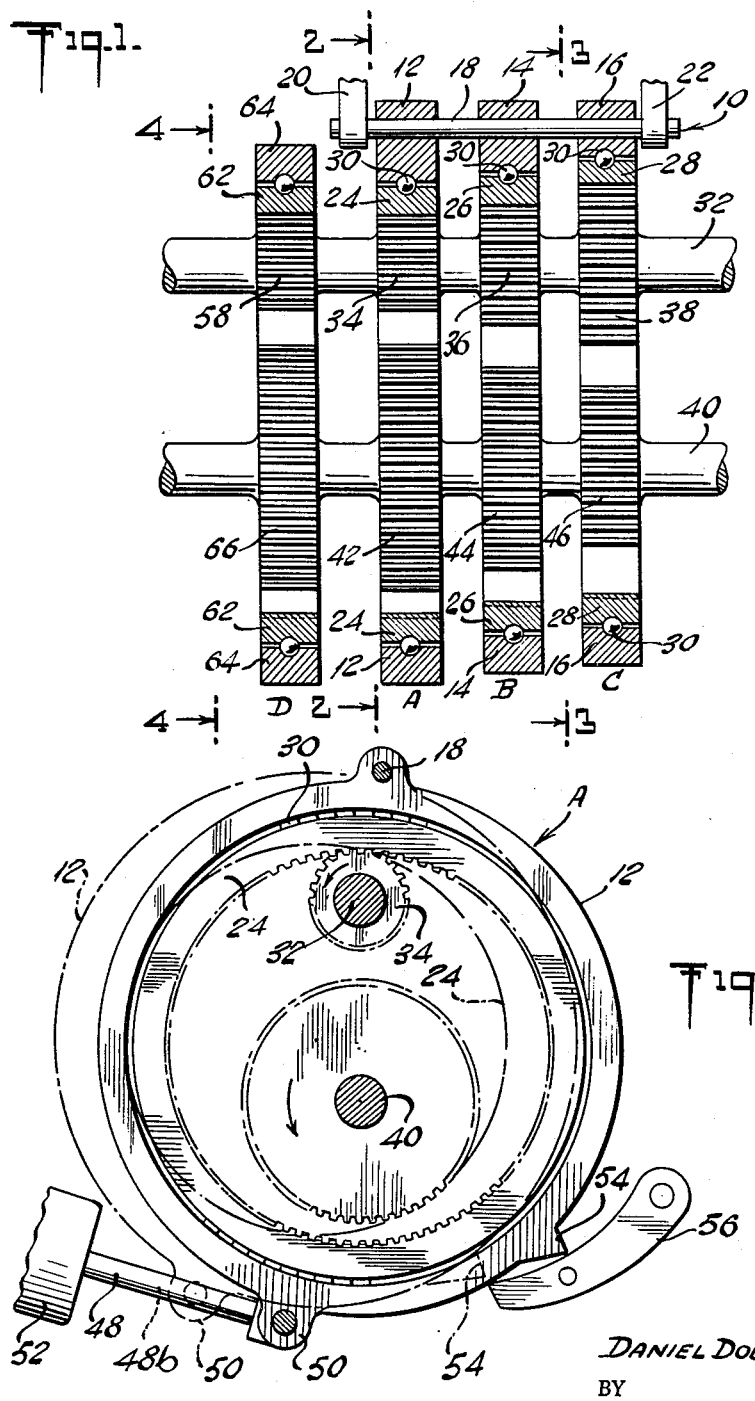
INVENTOR.
DANIEL DOUGLAS DEMAREST
BY
Moses, Nolte, & Nolte
ATTORNEYS May 31, 1960 D. D. DEMAREST 2,938,398
TRANSMISSION
Filed Oct. 16, 1958 2 Sheets-Sheet 2

INVENTOR
DANIEL DOUGLAS DEMAREST
BY Moses, Nolte, & Nolte
ATTORNEYS

United States Patent Office 2,938,398
Patented May 31, 1960

2,938,398

TRANSMISSION

Daniel Douglas Demarest, 14 N. Court,
Port Washington, N.Y.

Filed Oct. 16, 1958, Ser. No. 767,668

2 Claims. (Cl. 74—354)

This invention relates in general to a power transmission mechanism and particularly to a new and useful variable speed and power gear-transmission mechanism, capable of handling a large speed and power range within a compact, simple mechanism.

The present invention provides an inexpensive compact variable speed transmission capable of transmitting power over a large power range. The mechanism includes a pivotally mounted large internal gear which is freely rotatable and maintained in engagement with a gear on a drive shaft. The internal gear is movable about its pivot into contact with a driven gear on a load shaft to transmit power thereto from the drive shaft. The complete transmission includes a plurality of such internal gears which are automatically moved into engagement in sequence with combinations of driving and driven gears mounted on a single driving and driven shaft, respectively. The sequential engagement of the gear combinations effects a gradually increasing speed of the driven shaft as the power requirements during acceleration gradually change.

Accordingly, it is an object of this invention to provide an improved transmission.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

Fig. 1 is a fragmentary transverse sectional view of a three forward speed and a single reverse speed transmission constructed in accordance with the invention;

Fig. 2 is a vertical section taken on the line 2—2' of Fig. 1;

Figure 3:
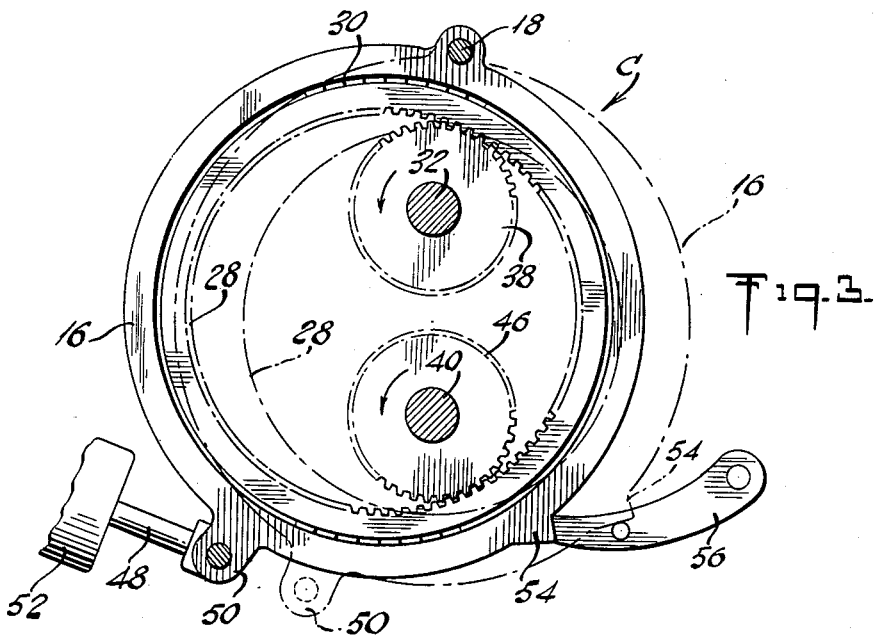
Fig. 3 is a vertical section taken on the line 3—3' of Fig. 1.
Figure 4:
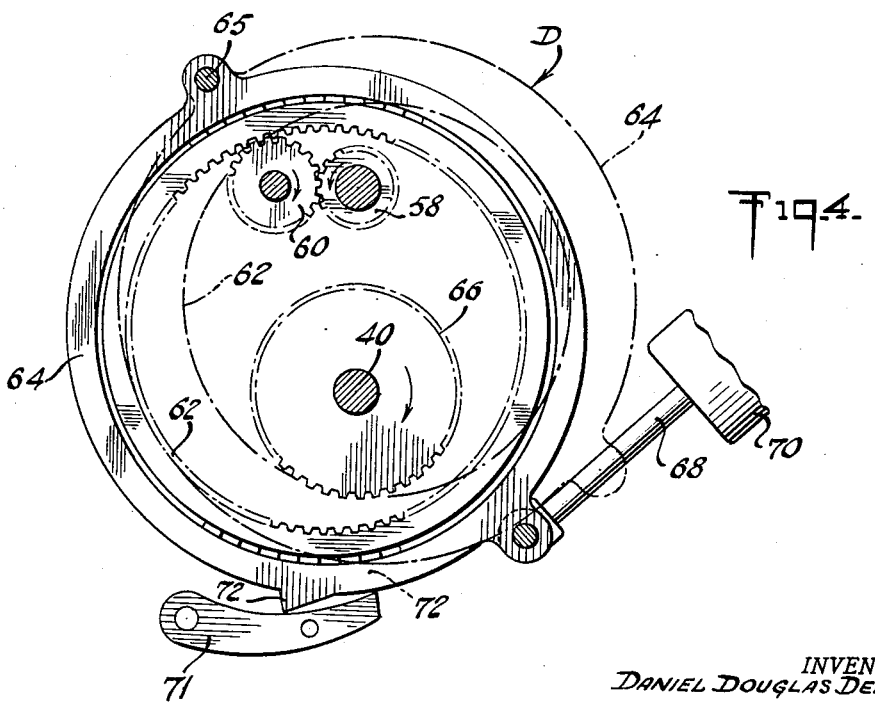
Fig. 4 is a vertical section taken on the line 4—4' of Fig. 1.

Referring to the drawings in particular the invention as embodied therein includes a transmission generally designated 10, including three forward speed sections, A, B, and C, and a reverse speed transmission section D. Each of the forward speed transmission sections A, B, and C includes an internal gear mounting rim 12, 14, and 16, respectively, each of which is pivotally mounted on a pivot bar 18 which is affixed to two spaced supporting bearings 20 and 22.

Internal gears 24, 26 and 28 are rotatably mounted on suitable bearings 30 in the rims 12, 14 and 16, respectively.

A suitable prime mover such as an automobile internal combustion engine (not shown) is arranged to rotate a main drive shaft 32. The drive shaft 32 is provided with a series of gears 34, 36 and 38 of varying diameter and number of gear teeth, each of which are in constant engagement with associated internal gears 24, 26 and 28, respectively.

In accordance with the invention a driven shaft 40 is arranged to receive power from the shaft 32 through one or more of the gears 34, 36 and 38 driving through their associated internal gears 24, 26 and 28.

To accomplish this, the driven shaft is provided with a series of gears 42, 44 and 46, positioned in alignment with but spaced from associated gears 34, 36 and 38 within each of the associated internal gears 24, 26 and 28.

Each of the internal gears 24, 26 and 28 is connected to a control arm 48 which is pivotally connected to an upstanding boss 50 at a location on the rims 12, 14 and 16 removed from a pivot bar 18. Each of the control bars 48 is slidable within a cylinder 52 under the control of a control button or lever (not shown) under the influence of a control system powered by an auxiliary such as an electric motor (not shown) either electrically, mechanically or hydraulically operated. Movement of the bar 48 moves the rims 12, 14 and 16 with their associated internal gears 24, 26 and 28 into an operative position in engagement with associated driven gears 42, 44 and 46, respectively as indicated in Fig. 2. When transmission of power from the shaft 32 to the shaft 40 is required, a control mechanism (not shown) is actuated to move the rim 12 of the lower speed but high power driving gears into engagement by withdrawing the control bar 48 into the cylinder 52 and effecting the movement of the rim 12 from a solid line position to the dotted line position indicated in Fig. 2. This effects driving between the driven gear 34, the internal gear 24 and the driven gear 42 to the shaft 40.

When the rim 12 is in the driving position, a protuberance 54 thereon engages with a pawl 56 to hold the rim in such driving position. The pawl 56 is spring-biased in a direction toward the rim 12 but is movable against said biasing to release the rim 12 under the control of the driving drag exerted by the driven gear 42. Thus, when the shaft 40 comes up to speed and the torque required by the driven shaft 40 drops off, the gear 42 will exert a smaller drag on the ring gear 24. When this drag has been reduced to a predetermined amount, a control mechanism (such as a hydraulic, magnetic or other similar control) moves a slide bar 48b (not shown) associated with the next rim 14 to move that rim internal gear into engagement with the gear 44. This effects increased speed of rotation of the shaft 40 and thus faster rotation of the gear 42. Since the gear 42 then begins to run faster than the internal ring gear 24, it tends to move out of mesh with the internal gear. A suitable control is then effective to actuate the slide 48 connected to the internal gear 24 to move it out of engagement with the lower speed gear 42 so that there will be no rubbing contact between the gear 42 and the gear 24.

When the higher speed gear 26 moves into mesh with the gear 44 it also effects movement of a control to move the pawl 56 against the force of its biasing spring to effect disengagement of the pawl from the rim 12.

The shaft 40 is then driven by the second set of speed gears 44 and 26 until the torque on gear 44 slackens off, at which point the rim 16 is moved by a control rod 48 associated therewith to bring the gear 28 into meshing engagement with the gear 46. Thereupon, the pawl holding the rim 14 is disengaged to permit complete disengagement of the gear 26 from its associated gear 44.

Also mounted on the drive shaft 32 is a reverse gear 58 which continuously meshes with a larger diameter gear 60 which is in meshing engagement with an internal gear 62 rotatably mounted within a rim 64. The rim 64 is pivotally mounted on a rod 65 affixed to a rigid support member (not shown). The driven shaft 40 is provided with a gear 66 which is arranged to mesh with the internal gear 62 when a slide bar 68 is moved by control mechanisms (not shown) within a cylinder 70. A pawl 71 similar to the pawl 56 engages a protuberance 72 on the rim 64 when the control rod 68 moves rim 64 into an operative position. Thus, engagement of the reversing gears 58, 60, 62 and 66 is made to rotate the driven shaft 40 in an opposite direction from the driving shaft 32.

It should be realized that if the operator desires to interrupt the automatic operation of the transmission which effects sequential mating of the gears 42, 44 and 46 with the gears 24, 26 and 28 during acceleration from a slow speed to a high speed, he merely interrupts the automatic operation by actuating a suitable control mechanism (not shown). The control mechanisms do not form a part of this invention and hence they have not been described in any particular detail in the present application.

While a specific embodiment of the invention has been shown and described in detail to illustrate the application of the invention principles, it will be understood that the invention may be embodied otherwise without departing from such principles.

I claim:

1. In a transmission mechanism including a supporting frame, a rotating driving gear and a rotatable driven gear rotatably mounted on said frame, the improvement comprising a rim member pivotally mounted on said frame, an internal gear rotatably supported within said rim and surrounding said driving and driven gear, said internal gear being in meshing engagement with said driving gear and being pivotally movable into driving engagement with said driven gear while remaining in engagement with said driving gear.

2. In a transmission mechanism according to claim 1 including means to pivot said rim whereby to move said internal gear into meshing engagement with said driven gear.

References Cited in the file of this patent

UNITED STATES PATENTS 2,431,149     Sylvander _____ Nov. 18, 1947